(12) United States Patent
Yetukuri et al.

(10) Patent No.: US 11,590,862 B2
(45) Date of Patent: Feb. 28, 2023

(54) SEATING SYSTEM

(71) Applicant: Lear Corporation, Southfield, MI (US)

(72) Inventors: Arjun Yetukuri, Rochester Hills, MI (US); Jasmine Pizana, Scottville, MI (US)

(73) Assignee: Lear Corporation, Southfield, MI (US)

( * ) Notice: Subject to any disclaimer, the term of this patent is extended or adjusted under 35 U.S.C. 154(b) by 406 days.

(21) Appl. No.: 16/711,661

(22) Filed: Dec. 12, 2019

(65) Prior Publication Data

US 2021/0178936 A1 Jun. 17, 2021

(51) Int. Cl.
| | |
|---|---|
| *B60N 2/12* | (2006.01) |
| *B60W 40/08* | (2012.01) |
| *G01C 21/34* | (2006.01) |
| *H04L 67/306* | (2022.01) |
| *G06F 16/9035* | (2019.01) |
| *G01C 21/36* | (2006.01) |

(52) U.S. Cl.
CPC ............... *B60N 2/12* (2013.01); *B60W 40/08* (2013.01); *G01C 21/3438* (2013.01); *G01C 21/3605* (2013.01); *G06F 16/9035* (2019.01); *H04L 67/306* (2013.01); *B60W 2040/0881* (2013.01)

(58) Field of Classification Search
None
See application file for complete search history.

(56) References Cited

U.S. PATENT DOCUMENTS

| | | | |
|---|---|---|---|
| 5,255,184 A | 10/1993 | Hornick et al. | |
| 9,333,880 B2 | 5/2016 | Farquhar et al. | |
| 9,383,872 B2 | 7/2016 | Yetukuri et al. | |
| 9,451,020 B2 | 9/2016 | Liu et al. | |
| 9,911,243 B2 | 3/2018 | Vats | |
| 10,147,325 B1 | 12/2018 | Copeland et al. | |

(Continued)

FOREIGN PATENT DOCUMENTS

| | | |
|---|---|---|
| DE | 102017202222 A1 | 10/2017 |
| DE | 102017114231 A1 | 1/2018 |

(Continued)

OTHER PUBLICATIONS

Copending U.S. Appl. No. 17/110,669, filed Dec. 3, 2020.
Webpage for Lear Connexus available at least as early as May 1, 2019 https://www.lear.com/Site/Technology/Lear-Connexus.aspx.

*Primary Examiner* — Lail A Kleinman
(74) *Attorney, Agent, or Firm* — Fishman Stewart PLLC

(57) ABSTRACT

A seating system include a seat assembly including a first seat, a track assembly, and/or an electronic control unit (ECU) configured to control movement of the first seat along the track assembly. The first seat may be configured to move along the track assembly in at least one direction. The ECU may be configured to communicate with an external network. The ECU may be configured to move the first seat proximate a door of a vehicle in response to information received from the external network. The first seat may include an actuator. The ECU may be configured to control movement of the first seat via the actuator, such as in response to the information received from the external network. The ECU may include a first seat profile including information corresponding to the first seat. The ECU may communicate with the external network regarding the first seat profile.

19 Claims, 7 Drawing Sheets

(56) References Cited

U.S. PATENT DOCUMENTS

| | | |
|---|---|---|
| 10,216,188 B2 | 2/2019 | Brady et al. |
| 11,052,786 B2 * | 7/2021 | Ajisaka ................ B60N 2/0224 |
| 2003/0046179 A1 | 3/2003 | Anabtawi et al. |
| 2004/0249685 A1 | 12/2004 | Douglas |
| 2006/0276960 A1 | 12/2006 | Adamczyk et al. |
| 2012/0101891 A1 | 4/2012 | Collier et al. |
| 2013/0054279 A1 | 2/2013 | Sharp et al. |
| 2014/0164188 A1 | 6/2014 | Zabawa et al. |
| 2014/0214696 A1 | 7/2014 | Laughlin et al. |
| 2014/0306500 A1 | 10/2014 | Dryburgh et al. |
| 2015/0317568 A1 | 11/2015 | Grasso et al. |
| 2016/0264021 A1 | 9/2016 | Gillett |
| 2016/0379631 A1 | 12/2016 | Wang et al. |
| 2018/0029716 A1 | 2/2018 | Sieben |
| 2018/0039917 A1 | 2/2018 | Buttolo et al. |
| 2018/0072188 A1 | 3/2018 | Yamada |
| 2018/0154799 A1 | 6/2018 | Lota |
| 2018/0244175 A1 | 8/2018 | Tan |
| 2018/0275648 A1 | 9/2018 | Ramalingam |
| 2019/0026886 A1 | 1/2019 | Ferguson et al. |
| 2019/0035282 A1 | 1/2019 | Ferguson et al. |
| 2019/0057481 A1 * | 2/2019 | Zhang .................... G06Q 50/30 |
| 2019/0347580 A1 * | 11/2019 | Jiwani ..................... G08G 1/20 |
| 2020/0047641 A1 | 2/2020 | D'Eramo et al. |
| 2020/0055423 A1 | 2/2020 | Prozzi et al. |
| 2020/0171979 A1 | 6/2020 | Yetukuri et al. |
| 2020/0189418 A1 * | 6/2020 | Sailer ...................... B60N 2/14 |
| 2021/0046888 A1 * | 2/2021 | Vardharajan .......... B60W 40/08 |

FOREIGN PATENT DOCUMENTS

| | | |
|---|---|---|
| JP | 2007310634 A | 11/2007 |
| JP | 2008158578 A | 7/2008 |
| WO | 18/144821 A1 | 8/2018 |

* cited by examiner

SEATING SYSTEM

TECHNICAL FIELD

The present disclosure generally relates to seating systems, including seating systems that may be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some seating systems may be relatively complex and/or may not provide sufficient functionality. Some seating systems may not be configured for use with networks and/or ride-share interfaces.

There is a desire for solutions/options that minimize or eliminate one or more challenges or shortcomings of seating systems. The foregoing discussion is intended only to illustrate examples of the present field and should not be taken as a disavowal of scope.

SUMMARY

In embodiments, a seating system may include a seat assembly including a first seat, a track assembly, and/or an electronic control unit (ECU) configured to control movement of the first seat along the track assembly. The first seat may be configured to move along the track assembly in at least one direction. The ECU may be configured to communicate with an external network. The ECU may be configured to move the first seat proximate a door of a vehicle in response to information received from the external network. The first seat may include an actuator. The ECU may be configured to control movement of the first seat via the actuator, such as in response to the information received from the external network. The ECU may include a first seat profile. The first seat profile may include information corresponding to the first seat of the seat assembly. The ECU may be configured to communicate with the external network regarding the first seat profile. The information may include a request and the request includes a user profile. The user profile may include (i) a biometric profile corresponding to the occupant, (ii) seat preference information, (iii) a location of the user/occupant, and/or (iv) a destination of the user/occupant.

With embodiments, the information may include a user profile. The user profile may include seat preference priority information. The seat preference priority information may indicate a priority of seat preferences of a user associated with the user profile. A seat assembly may include a second seat. The ECU may be configured to obtain a first seat profile associated with the first seat. The ECU may be configured to obtain a second seat profile associated with the second seat. The second seat profile may include information corresponding to the second seat of the seat assembly. The external network may be configured to compare the priority of seat preferences with the first seat profile and the second seat profile to assign the first seat or the second seat to the user.

In embodiments, a seating system may include an additional seat assembly. The external network may be configured to receive a user profile of a user associated with the request. The seat assembly is associated with a first vehicle. The additional seat assembly may be associated with a second vehicle. The additional seat assembly may include an additional seat having an additional seat profile. The additional seat profile may include information corresponding to the additional seat of the additional seat assembly. The external network may be configured to compare the user profile with the first seat profile and the additional seat profile to assign the first vehicle or the second vehicle to said user.

With embodiments, said external network may be configured to receive a user profile from an occupant. The user profile may include an indication to prioritize seat preference information or a vehicle wait time. The information from the external network may include a user profile of a user. The user profile may include occupant biometric information. The first seat may include a biometric sensor configured to obtain sensed biometric information of an individual occupying the first seat. The ECU may be configured to compare the occupant biometric information with the sensed biometric information to determine whether the individual occupying the first seat is said user.

In embodiments, a seat assembly may include a second seat. The second seat may include a second seat profile. The ECU may be configured to control movement of the second seat along the track assembly. Moving the first seat to be substantially proximate said door includes moving the second seat out of a movement path of the first seat. The ECU may be configured to move the second seat while moving the first seat. The ECU may be configured to return the first seat and the second seat to a previous position after loading of a user.

With embodiments, the information from the external network may include a first request from a first user. The information from the external network may include a second request from a second user. The ECU may be configured to plan a vehicle route including a first stop for the first user and a second stop for the second user. The ECU may be configured to move the first seat proximate the door prior the first stop. The ECU may be configured to move the second seat proximate the door prior to the second stop.

In embodiments, a seating system may include a vehicle including an electronic control unit (ECU) and a seat assembly having a first seat and a second seat. The ECU may be configured to control movement of the first seat and the second seat. A method of operating a seating system may include communicating, via the ECU, with an external network. The method may include receiving a request, via the external network, from a user. The request may include a user profile. The method may include moving the first seat to a position substantially aligned with a door of the vehicle to facilitate loading of said user. The user profile may include (i) a biometric profile corresponding to the user, and/or (ii) seat preference information. The method may include loading an occupant into the vehicle and/or determining, via the ECU and a biometric sensor of the first seat, whether the occupant is the user. Communicating with the external network via the ECU may include the ECU indicating that at least one of the first seat and the second seat are unoccupied and information corresponding to features of at least one of the first seat and the second seat. The method may include moving the second seat in a direction away from the door while moving the first seat to the position substantially aligned with the door. The method may include receiving, via the ECU, a second request associated with a second occupant, updating a vehicle route upon receiving the second request, and/or moving the second seat to the position substantially aligned with the door to facilitate loading of the second occupant. A seat assembly may include a plurality of additional seats. Moving the first seat to the position substantially aligned with the door may include minimizing movement of the plurality of additional seats.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
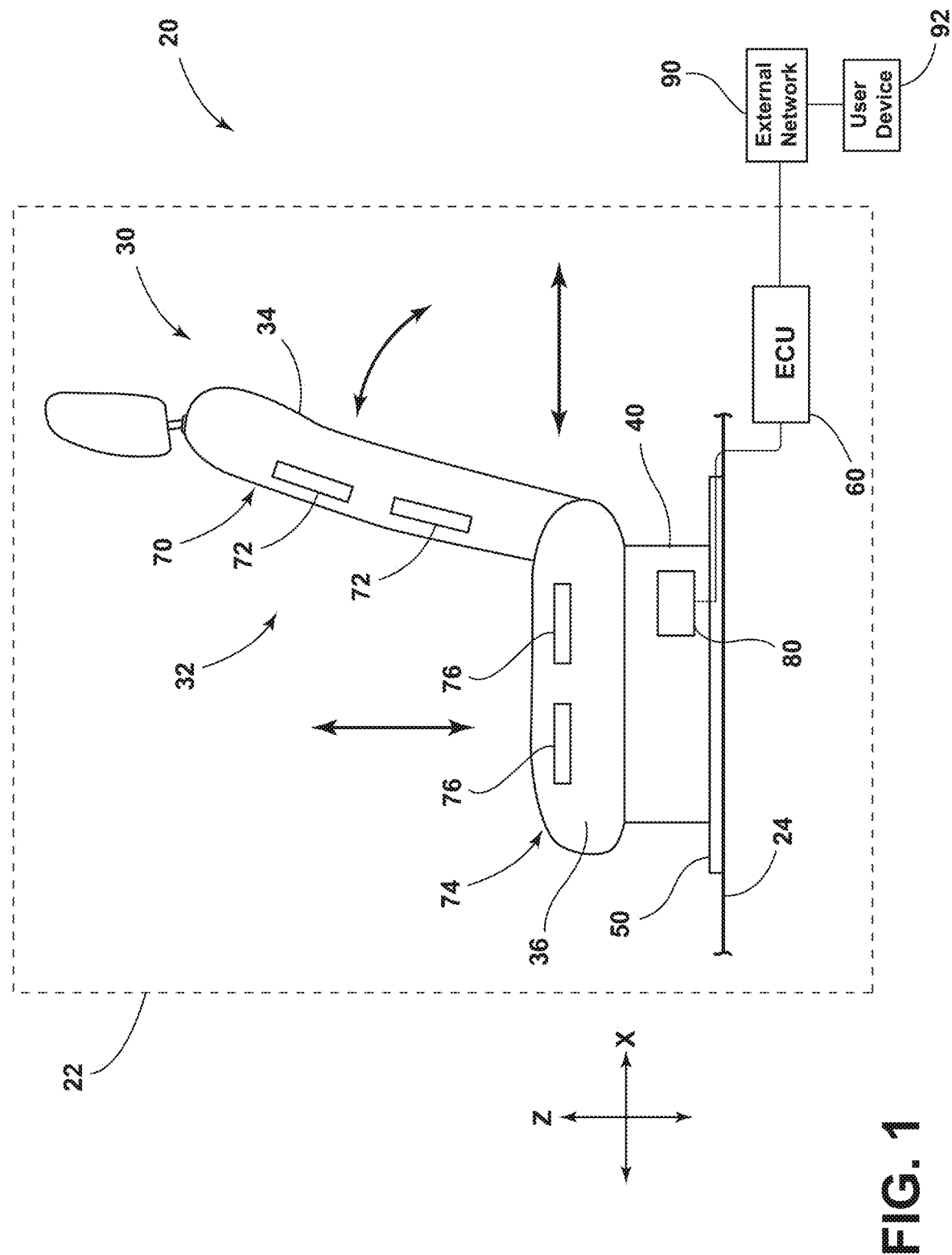
FIG. 1 is a side view generally illustrating an embodiment of a seating system according to teachings of the present disclosure.

In embodiments, such as generally illustrated in FIG. 1, a seating system 20 may include an adjustable assembly 30, a track assembly 50, and/or an electronic control unit (ECU) 60. The adjustable assembly 30 may be connected to the track assembly 50 and/or the ECU 60. An adjustable assembly 30 may include one or more support assemblies 32. An adjustable assembly 30 and support assemblies 32 may be configured as seats and/or for use with seats and may be referred to herein as seat assembly 30 and seats 32, but are not limited to seats or seating applications.

With embodiments, the ECU 60 may be configured to move one or more seats 32 of a seat assembly 30 along the track assembly 50. The ECU 60 may move one or more seats 32 to facilitate loading and/or unloading of occupants. The seating system 20 may be used in combination with a vehicle 22, may be disposed in a vehicle 22, and/or may be used in combination with a transportation cabin, but is not limited to use in connection with vehicles or transportation.

Figure 2B:
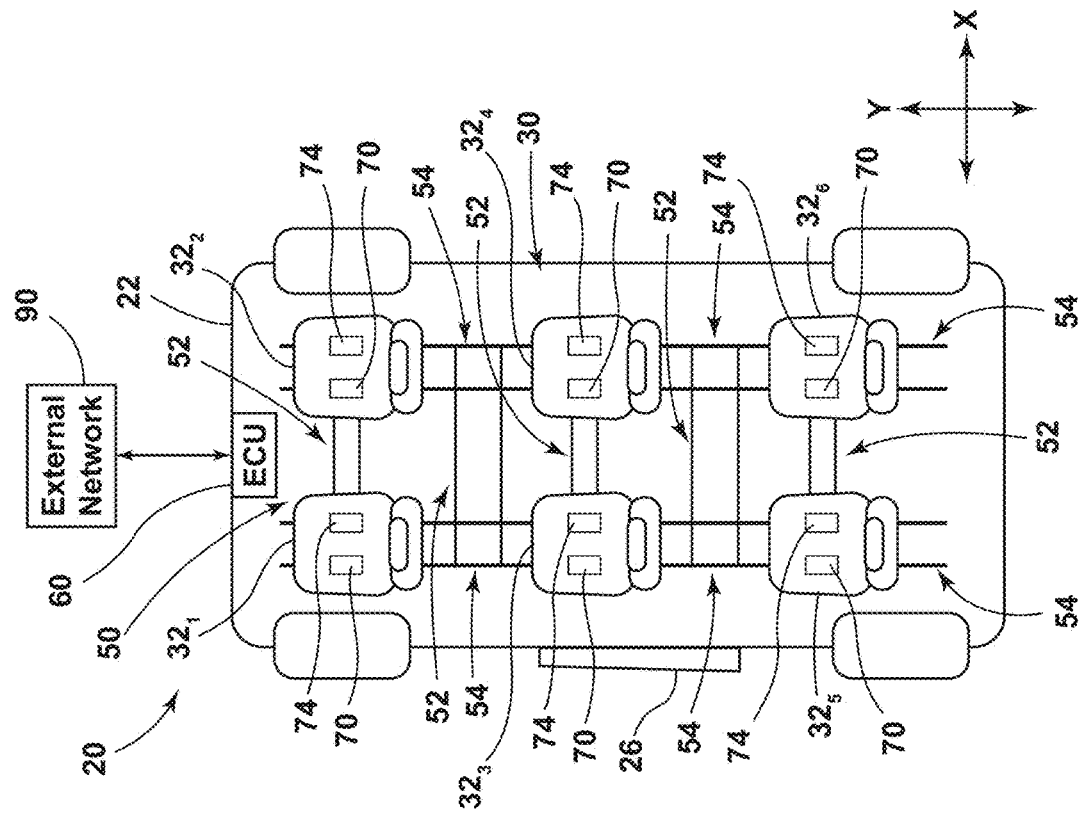
FIGS. 2A and 2B are top views generally illustrating embodiments of seating systems according to teachings of the present disclosure.
Figure 2A:
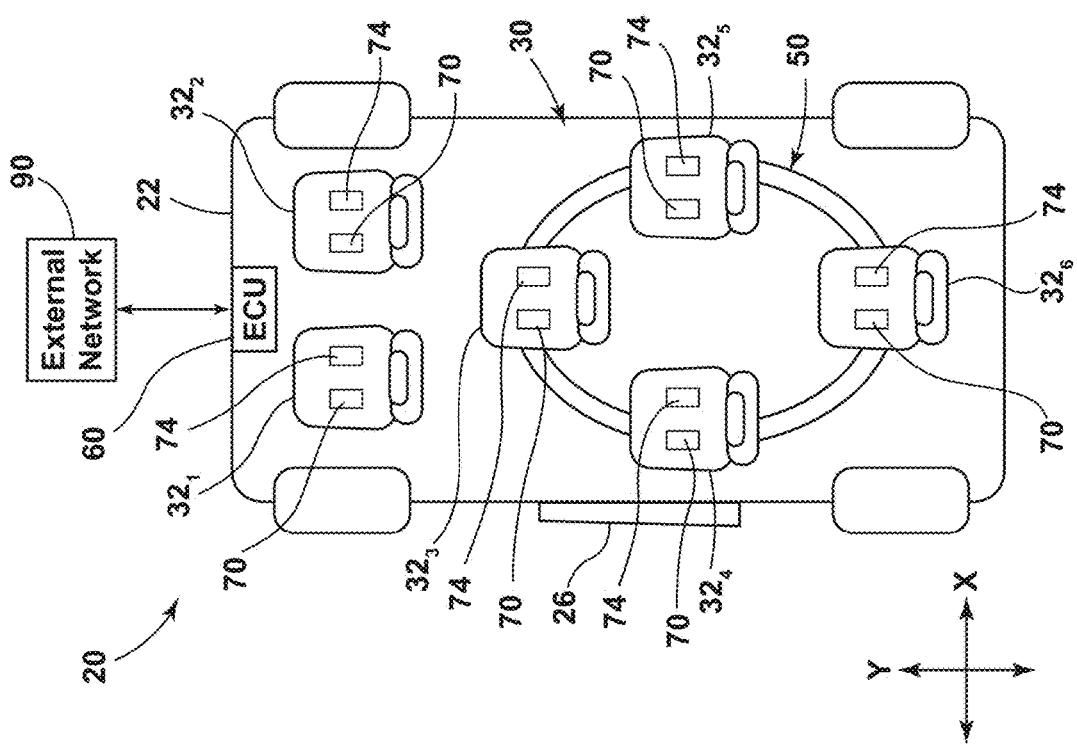

With embodiments, such as generally illustrated in FIGS. 2A and 2B, an adjustable assembly 30 may include a plurality of seats 32. For example and without limitation, the seat assembly 30 may include a first seat $32_1$, a second seat $32_2$, a third seat $32_3$, a fourth seat $32_4$, a fifth seat $32_5$, and/or a sixth seat $32_6$. The seats 32 may be selectively connected to the track assembly 50. The track assembly 50 may be disposed on and/or connected to a mounting surface 24 (e.g., a vehicle floor). The track assembly 50 may include one or more track portions 52, 54 that may be configured to facilitate movement of the seats 32 in at least one direction. For example and without limitation, the track assembly 50 may be configured to facilitate movement of the seats 32 in the X-direction and/or the Y-direction. One or more first track portions 52 may be aligned substantially in the X-direction and/or one or more second track portions 54 may be aligned substantially in the Y-direction. The track assembly 50 may, for example and without limitation, include one or more of a variety of shapes, sizes, and/or configurations, and may be configured such that seats 32 may move in at least two directions within a vehicle 22. The track assembly 50 may be curved and/or linear. The track assembly 50 may be configured such that the ECU 60 may move seats 32 to a position substantially proximate a vehicle door 26, such as to facilitate loading and/or unloading of occupants and/or cargo.

In embodiments, each seat 32 of the seat assembly 30 may include a support member 40. The support member 40 may be configured to support one or more portions of the seat 32 and/or one or more items or components that may be disposed on and/or connected to the seat 32 (see, e.g., FIG. 1). The support member 40 may be connected to one or more of a variety of accessories (e.g., vehicle accessories/components). For example and without limitation, the support member 40 may be connected to a seat base 36, a table, and/or a storage element (e.g., a console). The seat 32 may include a seat back 34 and/or a seat base 36. The support member 40 may support (e.g., mechanically) the seat back 34 and/or the seat base 36 on the track assembly 50. The seat 32 and/or the support member 40 may be configured to be selectively inserted into and/or selectively removed from the track assembly 50, such as in the Z-direction (e.g., in a plurality of locations along the track assembly 50).

With embodiments, such as generally illustrated in FIG. 1, one or more seats 32 of the seat assembly 30 may include an occupant sensor assembly 70 and/or a biometric sensor assembly 74. The occupant sensor assembly 70 may include one or more sensors 72 that may be configured to detect whether an occupant is seated in a respective seat 32 (e.g., pressure sensors, force sensors, etc.). The sensors 72 of the occupancy sensor assembly 70 may be disposed in the seat 32 (e.g., in the seat back 34 and/or the seat base 32). The occupant sensor assembly 70 may be electrically connected to the ECU 60 such that the ECU 60 may be configured to obtain information regarding the occupancy state of a seat 32 of the seat assembly 30 from the occupancy sensor assembly 70.

In embodiments, one or more seats 32 of the seat assembly 30 may include a biometric sensor assembly 74. The biometric sensor assembly 74 may be configured to measure one or more of a variety of biometric data of an occupant, such as via one or more sensors 76. For example and without limitation, the biometric sensor assembly 74 may be configured to measure heart rate, respiration, weight, fidget movements, and/or other parameters that may be associated with identifying an occupant. The biometric sensor assembly 74 may be electrically connected to the ECU 60 such that the ECU 60 may be configured to store information regarding the biometric characteristics of an occupant. With embodiments, the ECU 60 may be configured to utilize information from the biometric sensor assembly 74 to identify a specific occupant seated in a seat 32.

With embodiments, a seat assembly 30 may be connected (e.g., electrically) to an ECU 60. The ECU 60 may be configured to control movement of one or more seats 32 of the seat assembly 30. For example and without limitation, the ECU 60 may be configured to move the first seat $32_1$, the second seat $32_2$, the third seat $32_3$, the fourth seat $32_4$, the fifth seat $32_5$, and/or the sixth seat $32_6$ in at least one direction (e.g., forward, rearward, left, right, angled, tilting, rotational, etc.). The ECU 60 may be electrically connected to one or more actuators 80 that may be connected to the seats 32 of the seat assembly 30 (see, e.g., FIG. 3). The ECU 60 may control the actuators 80 to move the seats 32 along the track assembly 50 in at least one direction. The ECU 60 may be configured to move one or more seats 32 from a first position to a second position. The first position may correspond to a commute/ride position, and/or the second position may correspond to a loading position (e.g., the loading position may be a loading and unloading position). The ECU 60 may be configured to connect and/or communicate with an external network 90 (e.g., a network including a plurality of vehicles 22, communication infrastructure, such as for vehicle-to-infrastructure or V2I communication, etc.), and/or the ECU 60 may be configured to move one or more seats 32 according to information received from the network 90.

In embodiments, each seat $32_1$, $32_2$, $32_3$, $32_4$, $32_5$, $32_6$ of the seat assembly 30 may include a corresponding seat profile. For example and without limitation, the first seat $32_1$ may include a first seat profile, the second seat $32_2$ may include a second seat profile, the third seat $32_3$ may include a third seat profile, the fourth seat $32_4$ may include a fourth seat profile, the fifth seat $32_5$ may include a fifth profile, and/or the sixth seat $32_6$ may include a sixth profile. Each seat profile may be configured to include one or more various types of information. For example and without limitation, each seat profile may include information corresponding to seat features or preferences (e.g., seat warming functions, seat cooling functions, seat base adjustability, seat back adjustability, massage functions, leg room, overhead room, storage capabilities, padding level/quality, and/or seat position preference). The seat profile may include a status indicator such as to identify whether the seat 32 is occupied or available for occupancy (e.g., unoccupied). The seat profile(s) may be stored in the seats 32 and/or in the ECU 60.

Figure 3:
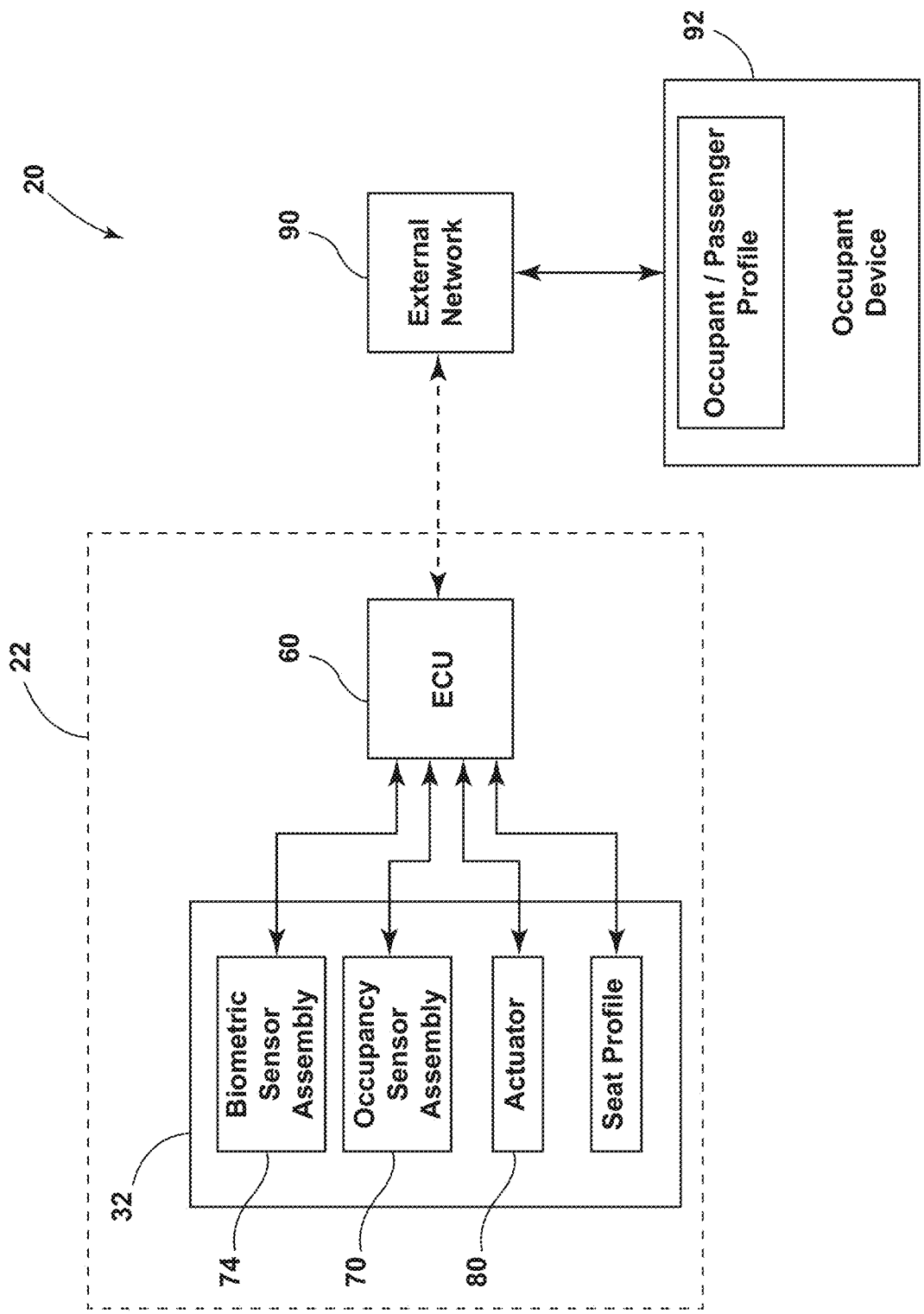
FIG. 3 is a diagram generally illustrating an embodiment of a seating system according to teachings of the present disclosure.
Figure 4:
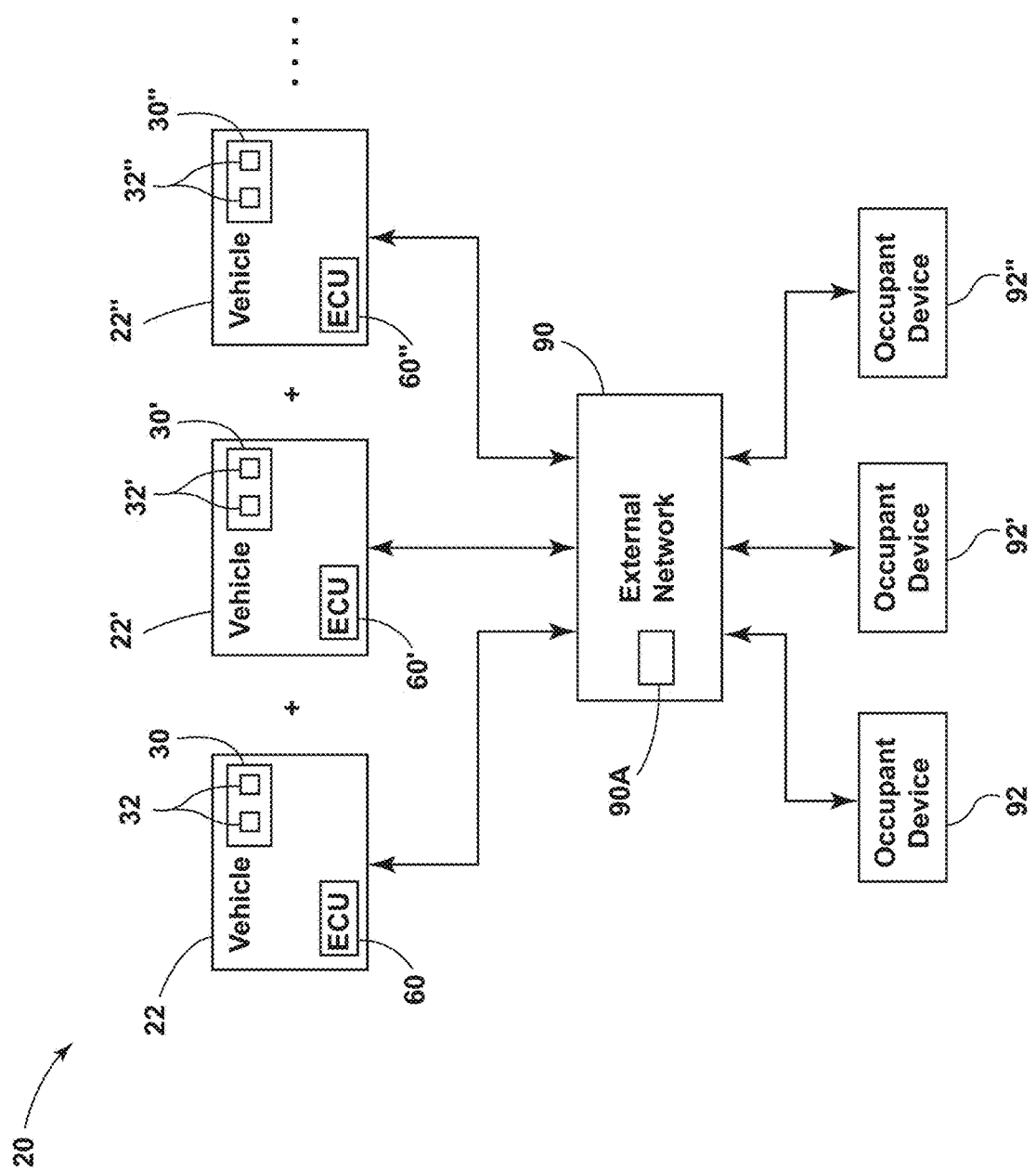
FIG. 4 is a diagram generally illustrating an embodiment of a seating system according to teachings of the present disclosure.

In embodiments, such as generally illustrated in FIGS. 3 and 4, the ECU 60 may be configured to wirelessly connect to the external network 90. The ECU 60 may be configured to obtain information from the external network 90. The external network 90 may include any number of computing devices 90A computers, servers, controllers, ECUs, routers, etc.) that may be configured to facilitate and/or may be responsible for vehicle-to-vehicle communication and/or vehicle-to-occupant device communication. The network 90 may, for example and without limitation, be configured as a ride-share network. The external network 90 may be configured to connect to and/or may include one or more ride-sharing platforms/networks/servers/interfaces (see, e.g., FIG. 4). The external network 90 may be configured to facilitate managing the transportation of individuals/passengers/occupants. The ECU 60 and/or external network 90 may be configured to plan routes, manage user profiles and/or seat profiles, and/or communicate with occupant mobile devices 92. For example and without limitation, the external network 90 may connect to any number of occupant mobile devices 92 or third-party networks (that may or may not be part of the external network 90), and/or the external network 90 may plan navigation routes and/or vehicle coordination for a number of occupant mobile devices 92, user profiles, and/or vehicles 22. The external network 90 may be responsible for selecting the most efficient vehicle 22 and/or passenger combination based, at least in part, upon the available vehicles, user profiles, and/or destinations (e.g., combinations that minimize travel time, energy usage, and/or traffic congestion, among others).

With embodiments, a user may utilize a mobile device 92 (or other electronic device) to submit a request (e.g., an electronic request) to the network 90. The ECU 60 and/or the network 90 may be configured to select a seat 32 in a seat assembly 30 of a plurality of seat assemblies 30 (e.g., of a plurality of vehicles 22) for the request. The ECU 60 and/or the network 90 may compare information about the seat assemblies 30 (e.g., seat profiles) to information associated with the request in selecting a seat 32 for the request. For example and without limitation, the ECU 60 may be configured to transmit at least a portion of the seat profile of one or more seats $32_1$, $32_2$, $32_3$, $32_4$, $32_5$, $32_6$ of a seat assembly 30 to the network 90. The seat profiles may, for example, include occupancy status and/or seat/vehicle features. The network 90 and/or the ECU 60 may be configured to compare one or more available seat profiles with a user profile associated with the request to select a seat 32 and/or vehicle 22 for the occupant. The user profile may include seat preference information of the occupant, a biometric profile corresponding to the occupant, a location of the occupant, a destination of the occupant, and/or a wait time preference of the occupant. Additionally or alternatively, the ECU 60 and/or the network 90 may be configured to prioritize the vehicle 22 or vehicles 22 that are or will be closest to the occupant, which may be determined, at least in part, via a global positioning system (GPS). The ECU 60 and/or the network 90 may compare the user profile with available seat profiles. The ECU 60 and/or the network 90 may automatically assign a seat 32 and/or may provide a plurality of seat options to the occupant (e.g., to the mobile device 92 of the occupant) for the occupant to select. In embodiments, the network 90 may present the occupant with expected arrival times and/or options corresponding to the pending request. The occupant may add and/or remove preferred seat features to decrease and/or increase a projected wait time for a vehicle 22 to arrive.

With embodiments, a user profile may include information corresponding to a priority order of the seat preference information of the user profile. For example and without limitation, each user profile may include an indication of which seat features are the most important to the occupant. The network 90 may prioritize the higher-prioritized seat features over the lower-prioritized seat features when determining or selecting a seat 32 (or seat options) for a potential occupant. The network 90 may utilize the location of the occupant and/or the destination of the occupant along with seat preference priority in selecting a seat 32 and/or seat options. The user profile may include a preferred vehicle wait time. The preferred vehicle wait time may correspond to how long a user is willing to wait for a seat 32 that matches the seating preferences of the user. For example and without limitation, if the user is not in a hurry and/or is going to be in the seat 32 for extended period, the user may be willing to wait longer than if the user is in a hurry. The external network 90 may be configured to provide the occupant with seat options within a vehicle 22 that may arrive to the occupant within the preferred vehicle wait time and/or may display seating options along with corresponding expected wait times.

In embodiments, such as generally illustrated in FIG. 4, the external network 90 may include and/or be configured to connect to a plurality of vehicles 22. The vehicles 22 may transmit information regarding the occupancy state of each seat (e.g., seat profiles) to the external network 90. For example and without limitation, the external network 90 may be connected to a first additional vehicle 22' and/or second additional vehicle 22". Each vehicle 22, 22', 22", may include a respective seat assembly 30, 30', 30" which may include respective seats 32, 32', 32", and a respective ECU 60, 60', 60". The external network 90 may be configured to communicate with a plurality mobile devices 92 (e.g., occupant devices) of a plurality of respective users/occupants. For example and without limitation, the external network 90 may communicate with a first additional device 92' and/or a second additional device 92". The external network 90 may be configured compare the information received from the vehicles 22, 22', 22" with the information received from mobile devices 92, 92', 92". to select a seat 32, 32', 32" or seat options for the users/occupants associated with the mobile devices 92, 92', 92".

Figure 5C:
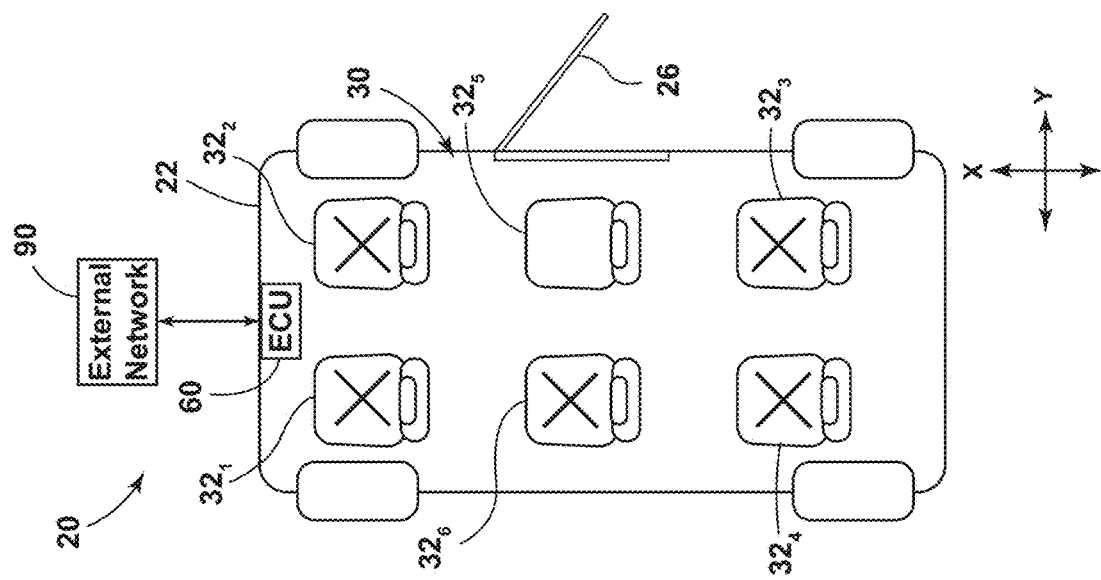
FIGS. 5A, 5B, and 5C are top views generally illustrating an embodiment of a seating system according to teachings of the present disclosure.
Figure 5B:
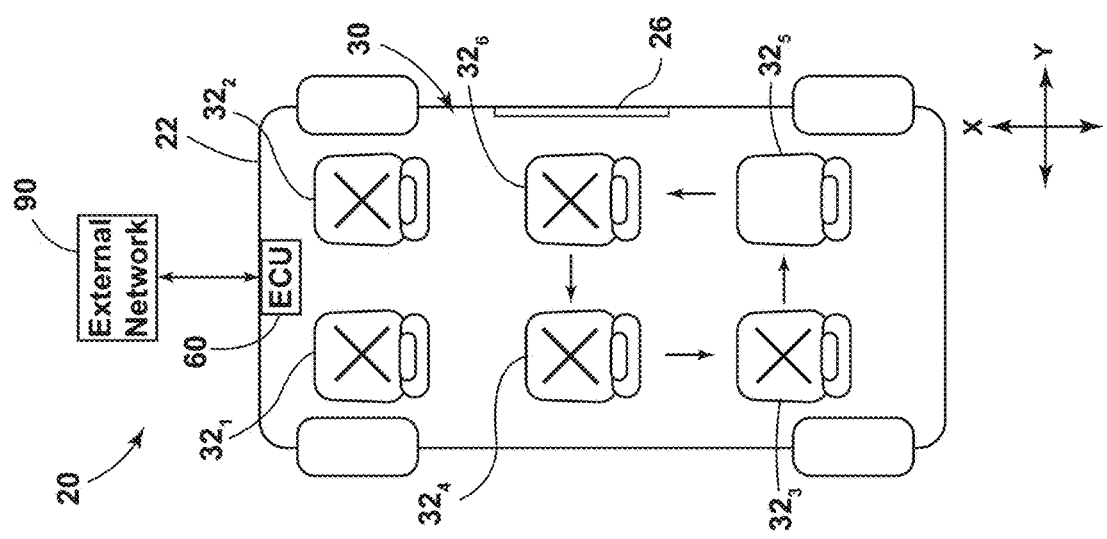
Figure 5A:
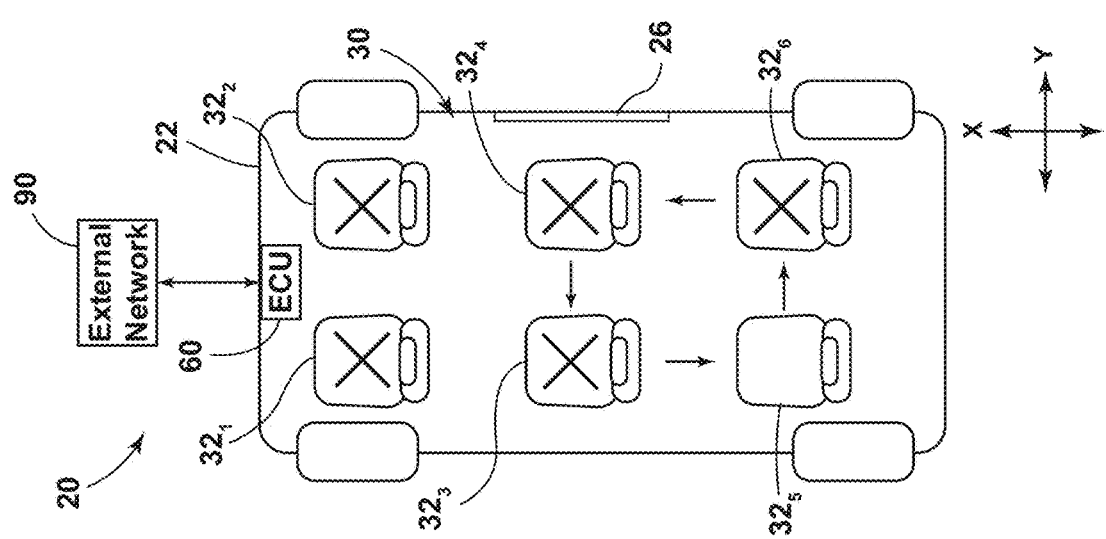

In embodiments, such as generally illustrated in FIGS. 5A, 5B, and 5C, an ECU 60 may be configured to move seats 32 of a seat assembly 30, such as to facilitate the loading and/or unloading of occupants. The ECU 60 may be configured to move one or more seats 32 of the seat assembly 30 in at least one direction. For example and without limitation, the ECU 60 may be configured to move the seats 32 of the seat assembly 30 in and/or about the X-direction, the Y-direction, and/or the Z-direction (and/or any combination thereof). The ECU 60 may receive information from the external network 90 that may designate a selected seat 32 for an occupant (e.g., as selected by the external network 90 and/or as chosen from seat options by the occupant). Prior to and/or at arrival at the occupant's location, the ECU 60 may move the selected seat (e.g., seat $32_5$) to a position substantially aligned with a door 26 of the vehicle 22. The ECU 60 may move one or more of the other seats $32_1$, $32_2$, $32_3$, $32_4$, $32_6$ of the seat assembly 30, such as to facilitate positioning the selected seat $32_5$ substantially or most proximate the door 26. The ECU 60 may determine the directions in which to move each of the seats 32 of the seat assembly 30 such that positing the selected seat $32_5$ substantially proximate the door 26, for example, involves the least amount of seat movement of the selected seat and/or the other seats (e.g., the ECU 60 may be configured to minimize seat movements).

With embodiments, the network 90 may communicate with the user's mobile device 92 to inform the user that a seat 32 has been reserved or selected for the user. The network 90 may communicate the seat profile and seat location to the user's mobile device 92. The location of the selected seat 32 may be displayed as a diagram and/or text. The location of the selected seat 32 may be given with respect to one of the doors on the vehicle 22, the approaching direction, and/or cardinal directions. For example and without limitation, the external network 90 may be configured to send a confirmation message to the user's mobile device 92 with the location of the selected seat 32 relative to a door (e.g., selected seat $32_5$ is located on the right side of the vehicle 22). For example and without limitation, the external network 90 may be configured to send a visual representation of the vehicle 22 to the user's mobile device 92 with the selected seat 32 indicated so that the user can see where the selected seat 32 is in the vehicle 22 (e.g. a layout of the vehicle floor with the selected seat 32 indicated). For example and without limitation, the external network 90 may be configured to communicate which door 26 will open (e.g., the door 26 on the north side of the vehicle 22 will open).

With embodiments, the ECU 60 may receive a request for a particular seat (e.g., the fifth seat $32_5$) of a seat assembly 30. As generally illustrated in FIG. 5A, the fifth seat $32_5$ (e.g., the reserved seat) may not be in a position substantially aligned with the door 26 (such as to facilitate easy loading and/or unloading of passengers/occupants/cargo). The ECU 60 may be configured to move the fifth seat $32_5$ closer to the door 26 and/or to move one or more of the remaining seats $32_1$, $32_2$, $32_3$, $32_4$, $32_6$ of the seat assembly 30. The ECU 60 may determine the manner in which to move the reserved seat $32_5$ that may cause the fewest number of seats 32 to move. For example and without limitation, the ECU 60 may determine that the third seat $32_3$, the fourth seat $32_4$, the fifth seat $32_5$, and/or the sixth seat $32_6$ may move such that the fifth seat $32_5$ (e.g., the selected seat) may be disposed substantially or most proximate the door 26. The ECU 60 may move the fifth seat $32_5$ in the Y-direction towards the door 26, the sixth seat $32_6$ in the X-direction towards the front of the vehicle 22, the fourth seat $32_4$ in the Y-direction away from the door 26, and/or the third seat $32_3$ in the X-direction towards the rear of the vehicle 22 (see, e.g., FIG. 5B). The ECU 60 may move the fifth seat $32_5$ in the X-direction towards the front of the vehicle 22 and/or the door 26, the sixth seat $32_6$ in the Y-direction away from the door 26, the fourth seat $32_4$ in the X-direction towards the rear of the vehicle 22, and/or the third seat $32_3$ in the Y-direction to the right (e.g., towards the door 26 of the vehicle 22). The ECU 60 may move the third seat $32_3$, the fourth seat $32_4$, the fifth seat $32_5$, and/or the sixth seat $32_6$ in a substantially counter-clockwise direction (e.g., simultaneously) until the reserved seat $32_5$ is substantially aligned with the door 26.

Figures 6A, 6B, 6C:
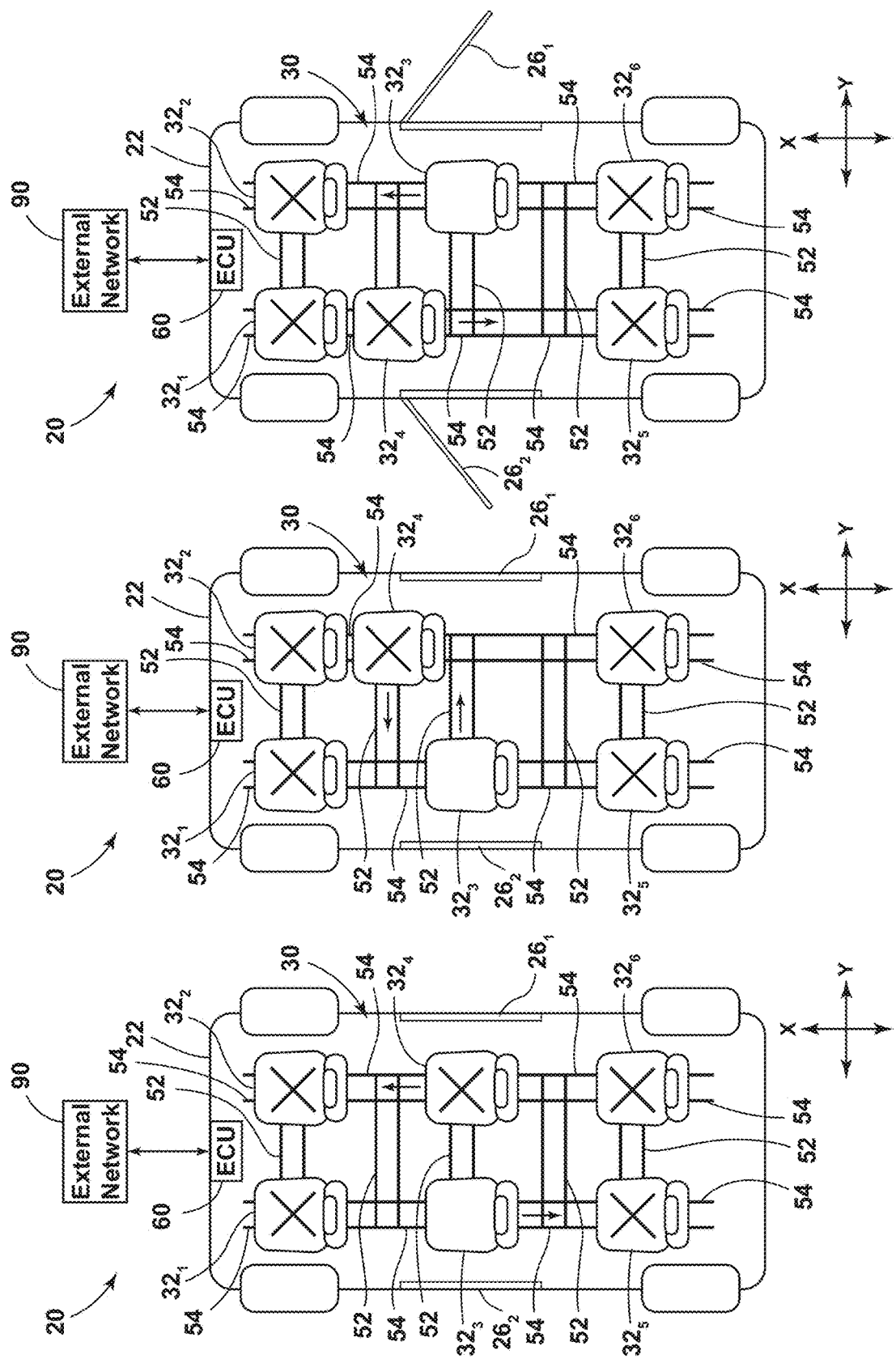
FIGS. 6A, 6B, and 6C are top views generally illustrating portions of an embodiment of a seating system according to teachings of the present disclosure.

In embodiments, the ECU 60 may be configured to move fewer seats if there is sufficient room between the seats 32 of the seat assembly 30. For example and without limitation, such as generally illustrated in FIGS. 6A, 6B, and 6C, a seat assembly 30 may include a first seat $32_1$, a second seat $32_2$, a third seat $32_3$, a fourth seat $32_4$, a fifth seat $32_5$, and/or a sixth seat $32_6$. The ECU 60 may be configured to move a selected seat (e.g., seat 32) substantially proximate the door 26. For example and without limitation, the reserved seat may be the third seat $32_3$. The ECU 60 may determine a minimum number of seat movements in order to position the reserved seat $32_3$ proximate the door 26. The ECU 60 may determine that the third seat $32_3$ and/or the fourth seat $32_4$ may be moved, such that the third seat $32_3$ may be disposed proximate the door 26. The ECU 60 may move the third seat $32_3$ in the X-direction toward the rear of the vehicle 22, and/or the ECU 60 may move the fourth seat $32_4$ in the X-direction toward the front of the vehicle 22 (see, e.g., FIG. 6A). The ECU 60 may move the third seat $32_3$ in the Y-direction towards the door 26, and/or the ECU 60 may move the fourth seat $32_4$ in the Y-direction away from the door 26 (see, e.g., FIG. 6B). The ECU 60 may move the third seat $32_3$ in the X-direction toward the front of the vehicle 22, and/or the ECU 60 may move the fourth seat $32_4$ in the X-direction toward the rear of the vehicle 22 (see, e.g., FIG. 6C).

In embodiments, the mobile device 92 may communicate with the external network 90 and the ECU 60 to determine which side of the vehicle 22 the user will be on when the vehicle 22 reaches the pick-up location. The vehicle 22 may have a first door $26_1$ and a second door $26_2$. The ECU 60 and/or the network 90 may determine whether the user will be on a first side of the vehicle 22 or a second side of the vehicle 22. The first side of the vehicle 22 may have a first door $26_1$ and the second side of the vehicle may have a second door $26_2$. The network 90 may communicate with the ECU 60 to determine whether the user will be on the first side of the vehicle 22 or the second side of the vehicle 22 at the pick-up location. The ECU 60 may move the selected seat 32 proximate the first door $26_1$ or second door $26_2$. For example and without limitation, the mobile device 92 may communicate to the external network 90 that a user is on a first side of the street (e.g. the north, south, east, or west side) corresponding to the second side of the vehicle 22 and the second door $26_2$, and the ECU 60 may move the selected seat 32 proximate the second door $26_2$.

With embodiments, if an occupant sits in a seat 32, the ECU 60 may be configured to determine whether the occupant is the user that selected the seat 32. For example and without limitation, if the occupancy sensor assembly 70, which may be activated upon a vehicle 22 reaching a pick-up location, senses that an occupant has started occupying a seat 32, the ECU 60 may be configured to compare biometric information from the user profile with the information obtained from the biometric sensor assembly 74 of the seat 32. If the user profile and the biometric data are substantially different, the vehicle 22 may not depart the location, and/or a warning may be issued to the occupant in the incorrect seat 32 and/or the incorrect vehicle 22. Additionally or alternatively, if the ECU 60 determines that the user profile and the sensed biometric data are substantially different, the ECU 60 may prompt the occupant with a login and/or verification process such that the biometric comparison may be overridden (e.g., in the situation of a faulty reading via the biometric sensor assembly 74). If the ECU 60 determines that user profile and the sensed biometric are substantially the same, the ECU 60 may close one or more doors 26 and/or the vehicle 22 may proceed to the subsequent stop, such as to drop off an occupant and/or pick up a user (e.g., a user may be considered an occupant once the user has entered a vehicle 22). In embodiments, the ECU 60 may be configured to move one or more seats 32 while the vehicle 22 is en route or in motion, such as to prepare for a subsequent stop. The ECU 60 may determine which seat 32 (or seats 32) should be proximate the door at the next stop of the vehicle 22 (e.g., an empty seat for a user that is being picked up and/or an occupied seat 32 whose occupant will be exiting). The ECU 60 may move the corresponding seat(s) 32 to a position that may be substantially aligned with one or more doors 26. For example and without limitation, if multiple users/occupants are entering or exiting at the same location, the ECU 60 may move a plurality of seats 32 to respective doors 26 of a vehicle to facilitate loading/unloading. The ECU 60 may be configured to move the seats 32 of the seat assembly 30 when the vehicle 22 is en route or in motion and/or when the vehicle 22 is stopped.

With embodiments, the ECU 60 may be configured to move one or more seats 32 in a sequence while the vehicle 22 is en route or in motion, such as to prepare for a subsequent stop with multiple users entering or exiting the vehicle 22 at the same location. The external network 90 may communicate with the occupant mobile device 92 to determine a loading or unloading sequence based on the location of the users at the same location. The same location may have a first user and a second user. The vehicle 22 may have a first selected seat $32_1$ reserved for a first user and a second selected seat $32_2$ reserved for a second user. The external network 90 may determine whether the first user or the second user is closer to the same location (e.g., if a first user and a second user are in line, which user is closer to the front of the line). The external network 90 may communicate with the ECU 60 to sequence which reserved seat should move proximate the door 26. For example and without limitation, the external network 90 may determine that a second user is closer to the pick-up location and communicate with the ECU 60 to move the second selected seat $32_2$ proximate the door 26 before moving the first selected seat $32_1$ proximate the door 26.

In embodiments, the ECU 60 may be configured to move one or more seats 32 in a sequence while the vehicle 22 is en route or in motion, such as to prepare for a subsequent stop with multiple users entering or exiting the vehicle 22 at the same location. The same location may have a first user with a first mobile device $92_1$ and a second user with a second mobile device $92_2$. The vehicle 22 may have a first selected seat $32_1$ reserved for a first user and a second selected seat $32_2$ reserved for a second user. The ECU 60 may determine a loading or unloading sequence based on the position of the selected seats $32_1$, $32_2$. The external network 90 may communicate with the occupant mobile device $92_1$, $92_2$ to display an alphanumeric character to denote a sequence of loading or unloading (e.g. an A for the first position, B for a second position, or C for a third position). For example and without limitation, a second selected seat $32_2$ may be proximate the door 26 and the external network 90 may communicate an 'A' to the second user with a second mobile device $92_2$ associated with the second selected seat $32_2$ and a 'B' to the first user with a first mobile device $92_1$ associated with the first selected seat $32_1$.

In embodiments, the ECU 60 may be configured to move one or more seats 32 proximate a door 26, such as to prepare for a subsequent stop with multiple users entering or exiting the vehicle 22 at the same location. The same location may have a first user with a first mobile device $92_1$ and a second user with a second mobile device $92_2$. The vehicle 22 may have a first selected seat $32_1$ reserved for a first user and a second selected seat $32_2$ reserved for a second user. The vehicle 22 may have a first door $26_1$ on a first side of the vehicle 22 and a second door $26_2$ on a second side of the vehicle 22. The ECU 60 may move the first selected seat $32_1$ associated with a first user proximate the first door $26_1$ or second door $26_2$. The ECU 60 may move the second selected seat $32_2$ associated with a second user proximate the first door $26_1$ or second door $26_2$. The first selected seat $32_1$ and the second selected seat $32_2$ may move in sequence or concurrently. For example and without limitation, the first mobile device $92_1$ may communicate to the external network 90 that the first user is on a first side of the street (e.g. the north, south, east or west side) corresponding to the second side of the vehicle 22 and the second door $26_2$, and the ECU 60 may move the selected seat $32_1$ proximate the second door $26_2$. Concurrently, the second mobile device $92_2$ may communicate to the external network 90 that the second user is on a second side of the street (e.g. the north, south, east or west side) corresponding to the first side of the vehicle 22 and the first door $26_1$, and the ECU 60 may move the selected seat $32_2$ proximate the first door $26_1$.

With embodiments, a selected seat 32 may be configured to provide indicia for the user to more easily identify the selected seat 32. The selected seat 32 may provide text, color, and/or be marked with a shape or symbol. The external network 90 may communicate the same text, color, shape or symbol to the occupant mobile device 92 before, after, or with the confirmation message. For example and without limitation, the selected seat may have a panel (e.g., an electronic display panel) capable of illuminating a color and the external network 90 may communicate with the occupant mobile device 92 to display the same color on the occupant mobile device 92 (e.g., the seat may use a purple illumination and the user may receive a communication showing a purple hue or the word purple).

In embodiments, the ECU 60 may utilize the user profiles of occupants of a vehicle 22 to determine seating preferences and may move seats 32 to one or more preferred locations (e.g., according to information stored on the user profile) during travel. For example and without limitation, if a user profile includes information indicating that an occupant prefers to sit on the right side, left side, rear, and/or front of the vehicle 22, the ECU 60 may move the seats 32 (e.g., occupants) to accommodate such preferences. In embodiments, if a preferred position of an occupant is already occupied, the ECU 60 may (i) move the occupied seat 32 out of the preferred location if the occupant of the occupied seat 32 does not have a preferred seat location, (ii) move a seat 32 to the preferred location after an occupant of the occupied seat 32 exits, and/or (iii) move a seat 32 to the preferred location if the occupied seat 32 moves to a different location.

With embodiments, the ECU 60 and/or the external network 90 may be configured to update the vehicle route and/or seat positions (e.g., destination sequencing) according to the destinations of occupants in the vehicle 22. If each seat 32 of the seat assembly 30 is occupied, the ECU 60 may not update the destination sequencing. If at least one seat 32 of the seat assembly 30 is unoccupied and the ECU 60 receives a request for an unoccupied seat 32, the ECU 60 may be configured to update the destination sequencing with the pickup location and/or destination of the requesting user (e.g., the information included in the user profile). Upon receiving the request, the ECU 60 may be configured to update the order of occupant pick up, the order of occupant drop off, the vehicle commute route, and/or the position of the seats 32.

Figure 7:
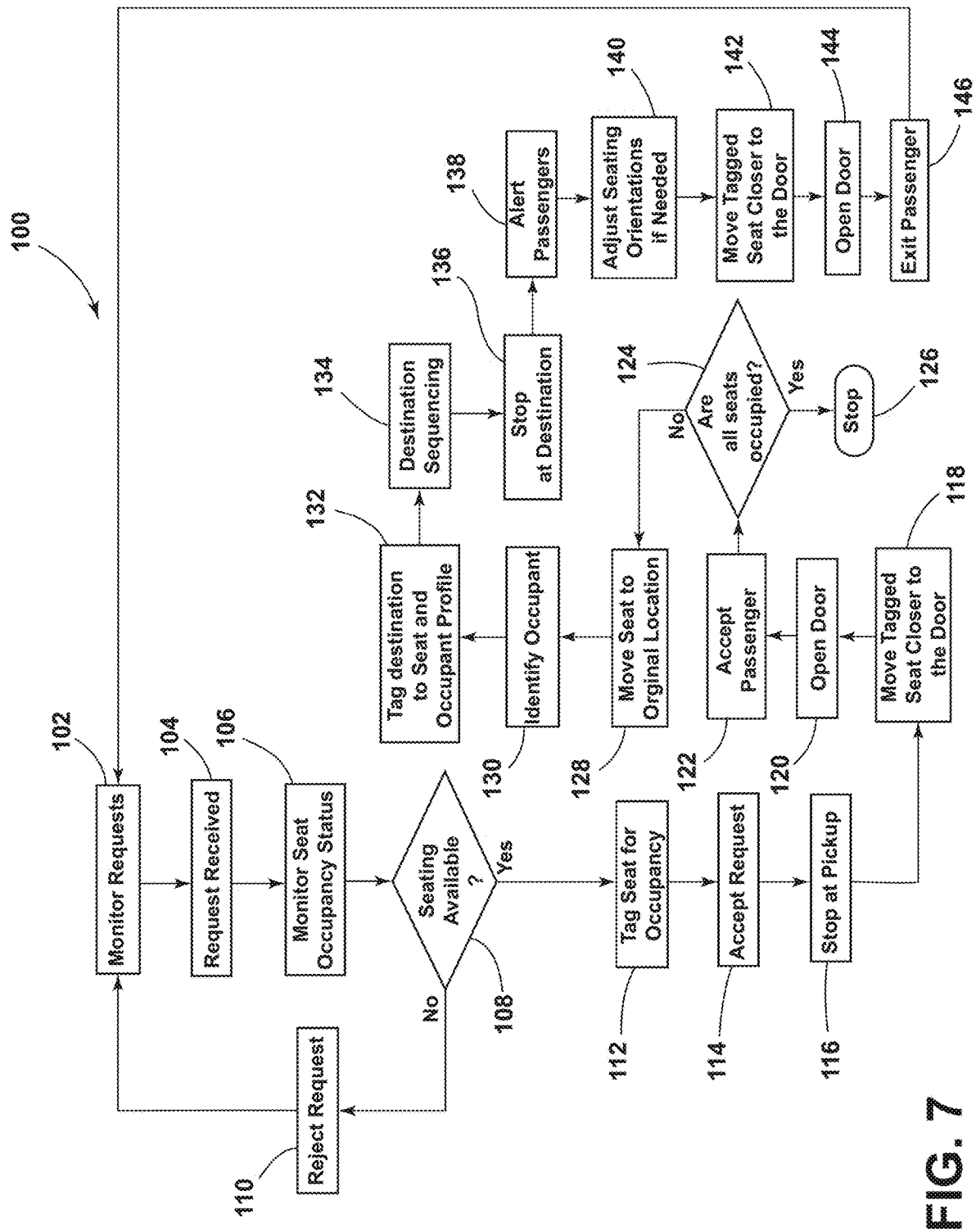
FIG. 7 is a flowchart generally illustrating portions of a method of operating a seating system according to teachings of the present disclosure.

With embodiments, such as generally illustrated in FIG. 7, a method 100 of operating a seating system 20 may include the ECU 60 and/or an external network 90 monitoring for user requests, such as for a ride-share (step 102). In embodiments, the external network 90 may receive the request and may provide it to the ECU 60 (step 104). Upon receiving a ride-share request, the ECU 60 may determine the occupancy of the seats 32 of the seat assembly 30 (step 106), such as via an occupancy sensor assembly 70. The ECU 60 may determine whether any seats 32 are unoccupied and/or determine whether a user profile associated with the request is compatible with an available seat 32 (step 108). If the ECU 60 determines that no seats are available, the ECU 60 may reject the request and/or the external network 90 may attempt to send the request to a different ECU 60/vehicle 22 (step 110). If the ECU 60 determines that at least one seat 32 is available, the ECU 60 may tag (e.g., select/reserve) the seat 32 (step 112) and/or may accept the request (step 114). Accepting the request may include sending an indication of acceptance to the external network 90 and/or to the use the request is accepted. The ECU 60 may control and/or communicate with the vehicle 22 to guide the vehicle 22 to a location identified in the request to pick up the used associated with the request.

In embodiments, the method 100 may include stopping the vehicle 22 at a location to pick up a user (step 116). The ECU 60 may communicate with the seats 32 of the seat assembly 30 to move a selected seat 32 substantially proximate the door 26 (step 118). A selected seat 32 may move, at least to some degree, prior to arrival at the location. The method 100 may include the ECU 60 automatically unlocking and/or opening the door 26 (e.g., or a user manually opening) (step 120), and the user may enter the vehicle 22 and sit in the selected seat 32 (step 122). The ECU 60 may verify the availability of one or more seats 32 when arriving at a pick-up destination (e.g., and/or during travel/movement of the vehicle) (step 124). If the ECU 60 determines that all seats 32 are occupied upon arrival at the pick-up location, the ECU 60 may stop the vehicle 22 and/or alert the occupants and/or transmit an alert to the external network 90 (step 126). If the reserved seat 32 is available, the user may sit in the reserved seat 32 and/or the ECU 60 may move the reserved seat back to the previous location within the vehicle 22 (step 128) or the preferred position according to user profile.

With embodiments, the method 100 may include identifying a new occupant, such as prior to vehicle movement and/or during vehicle movement. The ECU 60 may verify that the biometric information from the biometric sensor assembly 74 substantially corresponds to the biometric information in a user profile of the user associated with the request (step 130). The method 100 may include the ECU 60 adjusting the settings/seat features to substantially match one or more preferred seat settings stored on a user profile (e.g., temperature, seat base position, seat back position, etc.). The ECU 60 may be configured to access the user profile and assign the seat, vehicle type, and/or destination to the occupant (step 132).

With embodiments, the method 100 may include destination sequencing for occupants of the vehicle 22. For example and without limitation, the ECU 60 may determine the most direct or efficient vehicle route for the one or more destinations identified in the user profiles of the occupants (step 134). The method 100 may include the vehicle 22 arriving at a destination corresponding to one of the user profiles (136). The ECU 60 may be configured to alert the occupants within the vehicle 22 of arrival (step 138), and/or the ECU 60 may move the seats 32 of the seat assembly 30 such that the seat 32 of the occupant who is exiting is substantially or most proximate the door 26 (steps 140, 142). The method 100 may include the ECU 60 unlocking and/or opening the vehicle door 26 (step 144) and the occupant may exit the vehicle 22 (step 146).

In embodiments, an ECU (e.g., ECU 60) and/or the external network 90 may include an electronic controller and/or include an electronic processor, such as a programmable microprocessor and/or microcontroller. In embodiments, an ECU 60 may include, for example, an application specific integrated circuit (ASIC). An ECU 60 may include a central processing unit (CPU), a memory (e.g., a non-transitory computer-readable storage medium), and/or an input/output (I/O) interface. An ECU 60 may be configured to perform various functions, including those described in greater detail herein, with appropriate programming instructions and/or code embodied in software, hardware, and/or other medium. In embodiments, an ECU 60 may include a plurality of controllers. In embodiments, an ECU 60 may be connected to a display, such as a touchscreen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

It should be understood that an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A seating system, comprising:
    a seat assembly including a first seat and a second seat; and
    an electronic control unit (ECU) configured to control movement of the first seat and the second seat;
    wherein the ECU is configured to communicate with an external network;
    the ECU is configured to move the first seat with respect to a door of a vehicle in response to information from the external network;
    the information includes a first location associated with a first user, a first destination associated with said first user, a second location associated with a second user, and a second destination associated with said second user;
    moving the first seat with respect to said door includes moving the first seat proximate said door when said vehicle is proximate the first location and when said vehicle is proximate said first destination; and
    the ECU is configured to move the second seat proximate said door of said vehicle when said vehicle is proximate said second location and when said vehicle is proximate said second destination.

2. The seating system of claim 1, including a track assembly;
    wherein the first seat and the second seat are selectively vertically insertable into and removable from the track assembly.

3. The seating system of claim 1, wherein
    the ECU includes a first seat profile;
    the first seat profile includes information corresponding to the first seat of the seat assembly; and
    the ECU is configured to communicate with the external network regarding the first seat profile.

4. A seating system, comprising:
a seat assembly including a first seat; and
an electronic control unit (ECU) configured to control movement of the first seat;
wherein the ECU is configured to communicate with an external network; and the ECU is configured to move the first seat with respect to a door of a vehicle in response to information from the external network; and
the information includes a request from a first user; and
the request includes a user profile of the first user; and the user profile includes (i) a biometric profile corresponding to the first user, (ii) seat preference information, (iii) a location of the first user, and (iv) a destination of the first user;
wherein the information from the external network includes a second request from a second user;
the ECU is configured to plan a vehicle route including a first stop for the first user and a second stop for the second user;
the ECU is configured to move the first seat proximate the door prior the first stop; and
the ECU is configured to move a second seat proximate the door prior to the second stop.

5. The seating system of claim 1, wherein
the information from the external network includes a user profile;
the user profile includes seat preference priority information;
the seat preference priority information includes a priority of seat preferences of a user associated with the user profile;
the priority of seat preferences includes which features of a plurality of seat features are most important to said first user; and
the plurality of seat features includes seat warming, seat cooling, massage, seat base adjustability, and seat back adjustability.

6. The seating system of claim 5, wherein
the ECU is configured to obtain a first seat profile associated with the first seat;
the ECU is configured to obtain a second seat profile associated with the second seat;
the second seat profile includes information corresponding to the second seat of the seat assembly; and
the external network is configured to compare the priority of seat preferences with the first seat profile and the second seat profile, and to assign the first seat or the second seat to said user.

7. The seating system of claim 1, including an additional seat assembly; wherein
the information from the external network includes a user request;
the external network is configured to receive a user profile of a user associated with the user request;
the seat assembly is associated with a first vehicle;
the first seat has a first seat profile;
the additional seat assembly is associated with a second vehicle;
the additional seat assembly includes an additional seat having an additional seat profile;
the additional seat profile includes information corresponding to the additional seat of the additional seat assembly; and
the external network is configured to compare the user profile with the first seat profile and the additional seat profile to assign the first vehicle or the second vehicle to the user.

8. The seating system of claim 1, wherein
the information from the external network includes a user profile of a user;
the user profile includes occupant biometric information;
the first seat includes a biometric sensor configured to obtain sensed biometric information of an individual occupying the first seat; and
the ECU is configured to compare the occupant biometric information with the sensed biometric information to determine whether the individual occupying the first seat is the occupant.

9. The seating system of claim 1, wherein
the second seat includes a second seat profile;
and moving the first seat proximate said door includes determining a path to minimize movement of the second seat and moving the second seat out of a movement path of the first seat.

10. The seating system of claim 1,
wherein the ECU is configured to move the first seat with respect to the door of the vehicle and move the second seat with respect to a second door in response to information from the external network.

11. The seating system of claim 10, wherein the ECU is configured to move the second seat while moving the first seat.

12. The seating system of claim 11, wherein the ECU is configured to return the first seat and the second seat to a previous position after loading of an occupant.

13. A method of operating a seating system, comprising:
providing a vehicle including an electronic control unit (ECU) and a seat assembly having a first seat and a second seat, the ECU configured to control movement of the first seat and the second seat;
communicating, via the ECU, with an external network;
receiving a request, via the external network, from a user, the request including a user profile; and
moving the first seat to a position substantially aligned with a door of the vehicle to facilitate loading of said user;
wherein the seat assembly includes a plurality of additional seats; and
moving the first seat to the position substantially aligned with the door includes minimizing movement of the plurality of additional seats.

14. The method of claim 13, wherein the external network is configured to allow said user to add and remove preferred seat features from said user profile to modify a projected wait time.

15. The method of claim 13, including
loading an occupant into the vehicle; and
determining, via the ECU and a biometric sensor of the first seat, whether the occupant is said user.

16. The method of claim 13, wherein communicating with the external network via the ECU includes the ECU indicating that at least one of the first seat and the second seat are unoccupied and information corresponding to features of at least one of the first seat and the second seat.

17. The method of claim 13, including moving the second seat in a direction away from the door while moving the first seat to the position substantially aligned with the door.

18. The method of claim 17, including:
receiving, via the ECU, a second request associated with a second occupant;
updating a vehicle route upon receiving the second request; and moving the second seat to the position substantially aligned with the door to facilitate loading of the second occupant.

19. The method of claim 13, wherein the user profile includes a wait time preference.

* * * * *